Patented Sept. 23, 1930

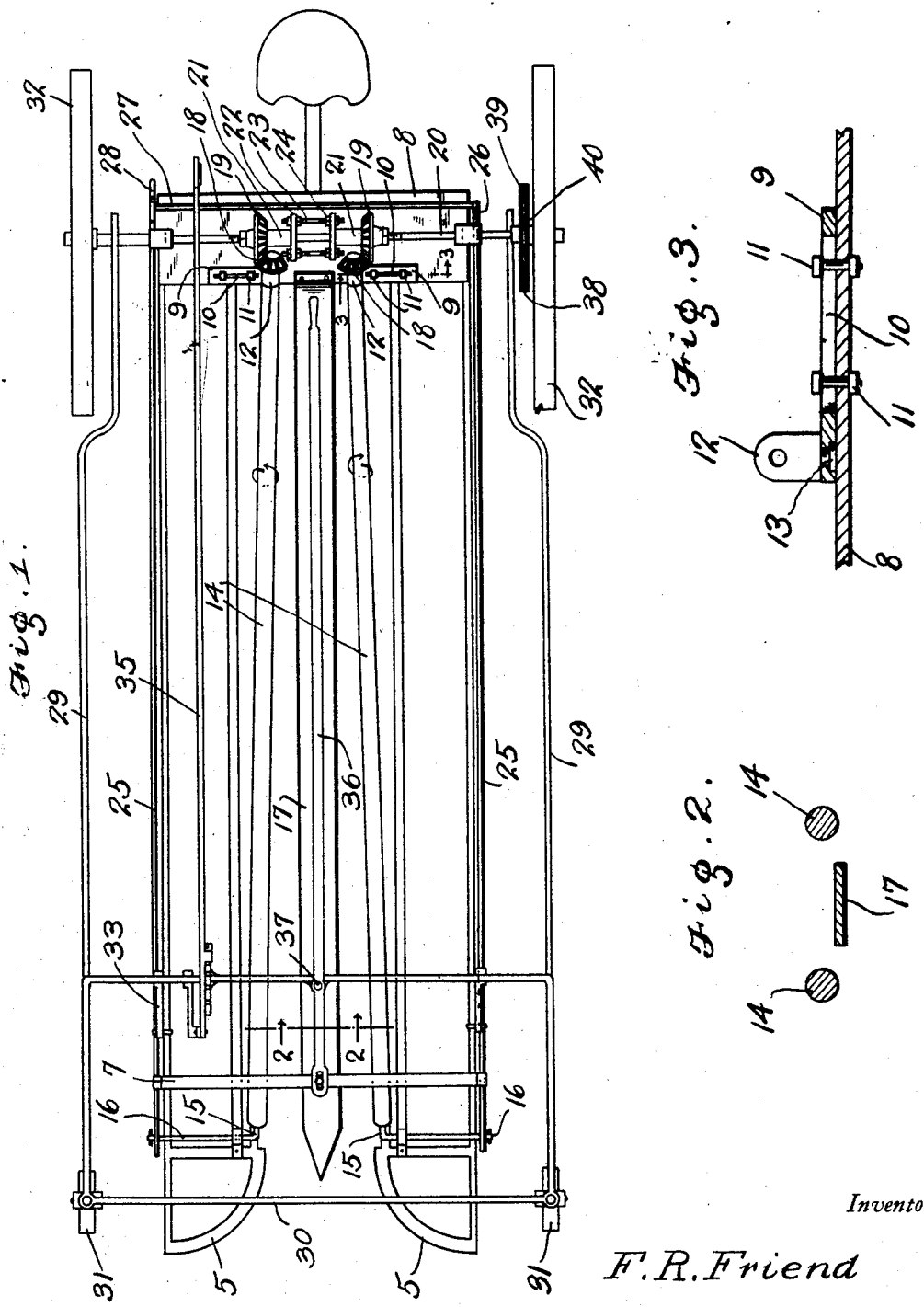

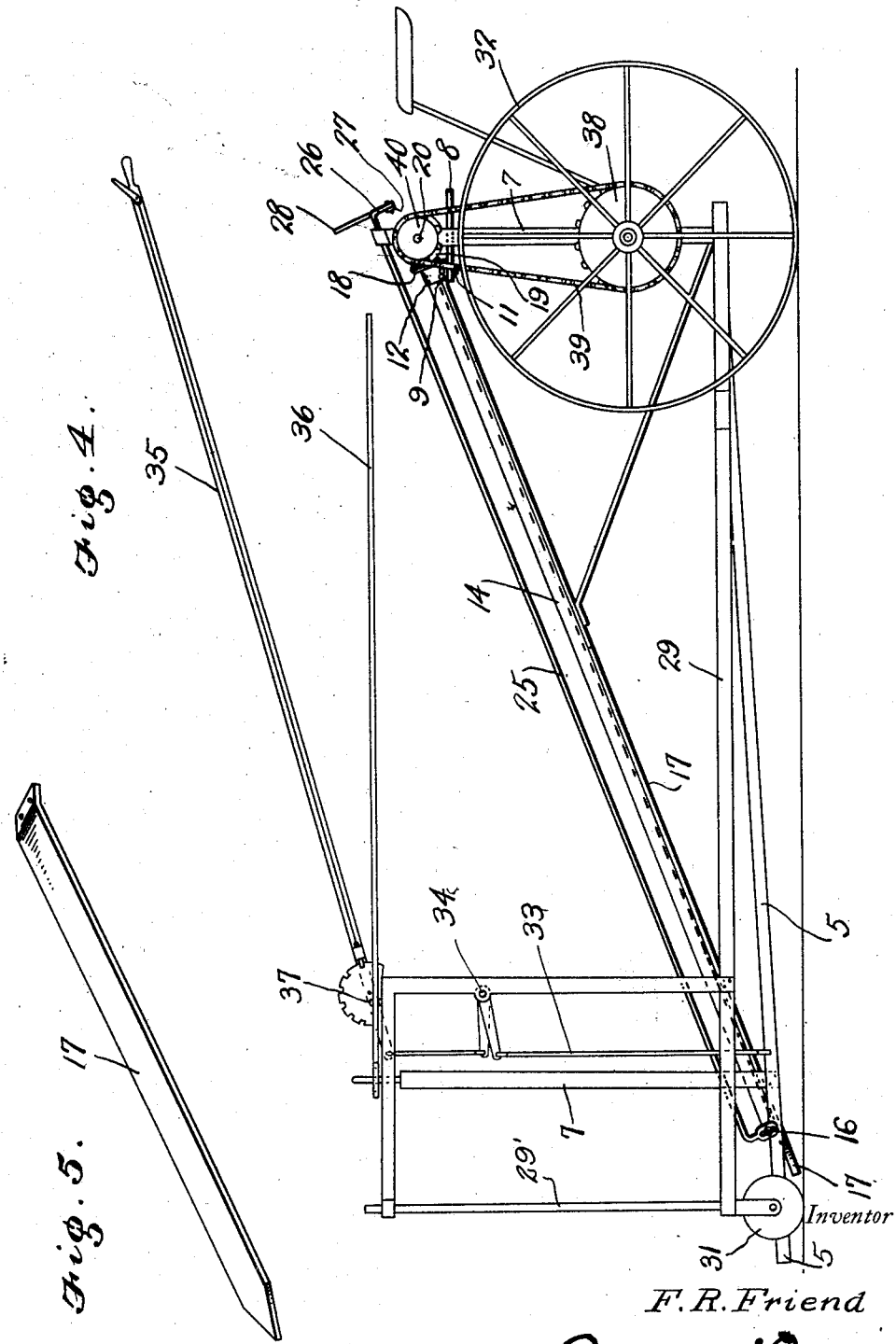

1,776,315

UNITED STATES PATENT OFFICE

FLOYD R. FRIEND, OF LUBBOCK, TEXAS

ADJUSTABLE STRIPPER FOR COTTON PICKERS

Application filed September 17, 1927. Serial No. 220,253.

This invention relates to cotton pickers and more particularly to the cotton stripping element and comprises essentially a pair of spaced parallel stripping rollers between which the cotton stalks are adapted to be guided whereby the cotton bolls may be engaged by the rollers and separated from the stalks as the picker travels over the cotton field.

Another object is to provide means at each end of the rollers enabling the same to be adjusted transversely so as to properly space the rollers in order to prevent clogging of the cotton between the same, depending on the size of the cotton stalks of the particular field being picked, the adjustment for the front end of the rollers being controlled from the operator's seat.

A further object is to arrange a divider extending in parallel relation between the rollers, enabling the rollers to be spaced at an increased distance so that the guide for directing the cotton plants into stripping position with respect to the rollers may cover a relatively wide area in order to properly engage the cotton plants which may be growing slightly out of line with respect to the row of cotton being picked.

A still further object is to provide an apparatus of this character of simple and practical construction, strong and durable, efficient and reliable in performance, relatively inexpensive to manufacture, and otherwise well adapted for the purposes for which the same is intended.

Other objects and advantages reside in the special construction and combination of the various elements constituting the invention, reference being had to the accompanying drawings forming part of this application, wherein:—

Figure 1 is a top plan view.

Figure 2 is a transverse sectional view taken along the line 2—2 of Figure 1.

Figure 3 is a similar view taken along the line 3—3 of Figure 1.

Figure 4 is a side elevational view showing the upwardly and rearwardly inclined position of the rollers enabling the same to engage the cotton growing at various elevated positions on the plant.

Figure 5 is a perspective view of the divider.

The frame members 5 are disposed with their forward ends inclined slightly downwardly and fairly close to the ground and may be connected by a transversely arranged arch member 7 of sufficient height to enable cotton plants to pass therethrough. The rear ends of the frame members are likewise connected by a similar arch member 7 upon the upper end of which is secured a plate 8 having a pair of bearing brackets 9 arranged thereon and provided with slotted openings 10 for receiving bolts 11 enabling the brackets to be adjusted transversely of the plate. Each bracket includes a roller shaft support 12 having its base pivotally secured to the bracket by a pin 13.

The rear ends of rollers 14 are rotatably mounted in said supports, said rollers extending forwardly of the frame in spaced parallel relation and inclined downwardly with their forward lower ends rotatably supported in the angular ends 15 of transversely disposed rods 16 attached to the frame members 5 and adapted for transverse adjustment whereby to permit the rollers to be adjusted in spaced relation with respect to each other.

A divider 17 is arranged in spaced relation between the rollers and inclined in the same plane throughout the length thereof, with the rear end of the divider fixedly secured to the plate 8.

The rear ends of the rollers have bevel gears 18 mounted thereon engaged by similar gears 19 mounted for rotation on a shaft 20 extending across the top of the plate 8. The beveled face of the gears 19 are oppositely disposed for engagement at opposite sides of the gears 18 whereby to cause the operation of the rollers in opposite directions and upwardly with respect to the respective edges of the divider so that as the rollers are moved into engagement with the plants and the latter passes between the rollers and the divider the cotton bolls will be pulled therefrom and thrown toward the side of the machine into a suitable receptacle (not shown).

The gears 19 are formed on sleeves 21 secured on the shaft 20 for rotation therewith and slidably disposed with respect thereto. The adjacent end of each sleeve has a flange 22 connected to each other by bolts 23 having adjusting nuts 24 enabling the gears to be secured in adjusted position to compensate for the adjustment of the rear ends of the rollers.

The lower ends of the rollers 14 are adapted to be moved toward each other by adjusting means comprising a pair of longitudinally extending rock shafts 25 effectively supported at their lower ends in bearings on the sides of the arch 7, as seen in Figure 1. At their respective upper ends, the shafts are supported in bearings carried by the plate 8. Each shaft has its lower end bent downwardly and attached to the outer end of one of the transverse rods 16 slidably supported in a suitable bearing on the frame member 5. The upper end of each rock shaft is also bent downwardly as at 26 and to one of the ends 26 is fixedly secured an operating lever 28 and to the end 26 of the other shaft is pivoted one end of a connecting link 27 which has the other end pivotally connected to the lever 28 above the axis of the lever. Then, when the lever is swung to rotate its own shaft in a clockwise direction, the other shaft will be rotated in an anti-clockwise direction through the medium of the connecting link 27. It will be seen, therefore, that when the lever is moved in one direction, the rods 16 will be shifted toward each by the rocking motion of their respective shafts and the ends of the rollers 14 will be moved simultaneously toward each other. Upon reverse movement of the lever, the ends of the rollers will be moved away from each other.

The frame members 5 are suspended upon a wheeled frame of any suitable construction, the present embodiment disclosing a frame having longitudinal members 29 provided with an upright 29' at their forward ends, said uprights being connected at their upper ends by a transverse member 30. Wheels 31 and 32 are mounted respectively at the front and rear of the apparatus.

Links 33 connect the frame members 5 with a cross rod 34 to which is attached one end of a lever 35 arranged for the vertical adjustment of the frame members 5.

If desired the front ends of the frame members 5 may be moved transversely so as to guide the same along opposite sides of the cotton plant by means of a lever 36 pivotally mounted at 37 to the wheeled frame with its forward end attached to the arch member 7.

A sprocket wheel 38 is carried by one of the rear wheels operating a chain 39 engaging a sprocket 40 mounted on one end of the shaft 20 and by means of which the rollers 14 are operated.

In the operation of the device, the machine is moved across the field, so that the plants will pass between the divider 17 and either of the rollers or strippers 14 and as the plants move rearwardly with respect to the machine, toward the converging ends of the dividers and rollers, the cotton bolls are pulled from the plants and through the rotary movement of the rollers will be thrown toward the adjacent side of the machine into a suitable receptacle carried on the frame 5. Should the plants be out of alignment, the divider will force the same to one side for stripping engagement by one of the rollers.

It is obvious that the invention is susceptible of various changes and modifications without departing from the spirit or scope of the appended claims, or sacrificing any of its advantages, and I accordingly claim all such forms of the device to which I am entitled.

I claim:—

1. In a cotton stripper, a wheeled frame comprising a pair of elongated frame members arranged in spaced parallel relation, a divider extending longitudinally therebetween, rollers mounted between the divider and each of said frame members in spaced relation from the former said divider and said roller being arranged at an inclination to the ground for engaging a cotton plant for the removal of the cotton bolls therefrom and means for adjusting said rollers with respect to said divider.

2. In a cotton stripper, a wheeled frame comprising a pair of elongated frame members arranged in spaced parallel relation, a divider extending longitudinally between said members, rollers rotatably carried by the frame and disposed in spaced parallel relation with respect to said divider, said divider and said roller being arranged at an inclination to the journal to engage a cotton plant so as to remove the cotton bolls therefrom, independent adjusting means for each end of said rollers and means rotatably connecting the rollers with the wheels of the frame.

3. In a cotton stripper, a plurality of stripping rollers, a divider positioned between said rollers in spaced parallel relation therewith and adapted to co-act with the rollers in accomplishing the stripping action and means for supporting said rollers and the divider relative to each other.

4. In a cotton stripper, a plurality of stripping rollers, a divider positioned between said rollers in spaced parallel relation therewith said rollers and said divider being arranged at an inclination to the ground, means for adjusting the rollers with respect to the divider and means for supporting said rollers and the divider relative to each other.

5. In a cotton stripper, a plurality of stripping rollers, a divider positioned between said rollers in spaced parallel relation therewith said rollers and said divider being arranged at an inclination to the ground, independent adjusting means for each end of the rollers and means for supporting said rollers in adjusted position with respect to the divider.

6. In a cotton stripper, a plurality of stripping rollers, a divider positioned between said rollers in spaced parallel relation therewith said rollers and said divider being arranged at an inclination to the ground, independent adjusting means for each end of the rollers and including an adjusting lever connected with the front ends thereof providing for the simultaneous and uniform adjustment thereof and means for supporting the rollers in adjusted position with respect to the divider.

In testimony whereof I affix my signature.

FLOYD R. FRIEND.